US012388490B2

(12) United States Patent
Gonzales et al.

(10) Patent No.: US 12,388,490 B2
(45) Date of Patent: Aug. 12, 2025

(54) RECEIVER EQUALIZATION CIRCUITRY USING VARIABLE TERMINATION AND T-COIL

(71) Applicant: Advanced Micro Devices, Inc., Santa Clara, CA (US)

(72) Inventors: Dean E. Gonzales, Fort Collins, CO (US); Edoardo Prete, Boxborough, MA (US); Milam Paraschou, Santa Clara, CA (US); Mark Chirachanchai, Boxborough, MA (US); Gerald R. Talbot, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 44 days.

(21) Appl. No.: 17/705,022

(22) Filed: Mar. 25, 2022

(65) Prior Publication Data

US 2023/0308132 A1    Sep. 28, 2023

(51) Int. Cl.
*H04B 3/14* (2006.01)
*H04B 3/26* (2006.01)
(Continued)

(52) U.S. Cl.
CPC .............. *H04B 3/141* (2013.01); *H04B 3/145* (2013.01); *H04B 3/26* (2013.01); *H04B 3/46* (2013.01); *H01F 17/08* (2013.01)

(58) Field of Classification Search
CPC .......... H01L 27/02; H01L 27/08; H03F 1/56; H03F 3/19; H03F 3/45; H03H 7/38;
(Continued)

(56) References Cited

U.S. PATENT DOCUMENTS 5,739,707 A    4/1998 Barraclough
6,166,563 A   12/2000 Volk et al.
(Continued)

FOREIGN PATENT DOCUMENTS

KR   10-2021-0094458   *  7/2021   .............. H01L 27/02

OTHER PUBLICATIONS

Dally, et al, "Digital Systems Engineering", Cambridge University Press, 1998, pp. 95-99, 110-111, 145-146, 362-366, 514-522, 526, 529, 565-566.

*Primary Examiner* — Shawkat M Ali
(74) *Attorney, Agent, or Firm* — Kowert, Hood, Munyon, Rankin & Goetzel, P.C.; Rory D. Rankin

(57) ABSTRACT

Systems, apparatuses, and methods for performing efficient data transfer in a computing system are disclosed. A computing system includes multiple transmitters sending singled-ended data signals to multiple receivers. In order to better handle noise issues when using single-ended signaling, one or more of the receivers include equalization circuitry and termination circuitry. The termination circuitry prevents reflection on a corresponding transmission line ending at a corresponding receiver. The equalization circuitry uses a bridged T-coil circuit to provide continuous time linear equalization (CTLE) with no feedback loop. The equalization circuitry performs equalization by providing a high-pass filter that offsets the low-pass characteristics of a corresponding transmission line. A comparator of the receiver receives the input signal and compares it to a reference voltage. The placement of the comparator and the ratio of the inductances of the inductors of the bridged T-coil circuit are based on whether the receiver includes self-diagnostic circuitry.

20 Claims, 8 Drawing Sheets

(51) Int. Cl.
*H04B 3/46* (2015.01)
*H01F 17/08* (2006.01)

(58) Field of Classification Search
CPC ... H03H 7/40; H03H 7/46; H04B 1/00; H04B 1/04; H04B 1/10; H04B 1/16; H04B 3/00; H04B 3/26; H04B 3/46; H04B 3/141; H04B 3/145
USPC .......................... 375/219, 229, 252, 295, 316
See application file for complete search history.

(56) References Cited

U.S. PATENT DOCUMENTS

| | | | |
|---|---|---|---|
| 6,393,062 B1 | 5/2002 | Furman et al. | |
| 6,518,792 B2 | 2/2003 | Jong et al. | |
| 6,704,818 B1 | 3/2004 | Martin et al. | |
| 6,794,909 B1 | 9/2004 | Urakami et al. | |
| 6,909,305 B1 | 6/2005 | Li et al. | |
| 7,135,884 B1 | 11/2006 | Talbot et al. | |
| 7,227,382 B1 | 6/2007 | Talbot et al. | |
| 10,530,325 B1* | 1/2020 | Gonzales | H04L 25/0292 |
| 10,541,841 B1 | 1/2020 | Sun et al. | |
| 10,944,397 B1* | 3/2021 | Yuan | H03K 17/6872 |
| 2020/0099406 A1* | 3/2020 | Singh | H01L 27/0248 |
| 2021/0320679 A1* | 10/2021 | Liu | H04B 1/18 |
| 2021/0328617 A1* | 10/2021 | Liu | H03F 3/72 |
| 2023/0027964 A1* | 1/2023 | Park | H01L 23/5227 |
| 2023/0253990 A1* | 8/2023 | Singh | H03F 3/19 |
| | | | 455/552.1 |

\* cited by examiner

RECEIVER EQUALIZATION CIRCUITRY USING VARIABLE TERMINATION AND T-COIL

BACKGROUND

Description of the Relevant Art

When transferring information between functional blocks in a semiconductor chip, electrical signals are sent on multiple, parallel metal traces. Transmitters in a first functional block send the electrical signals across the parallel metal traces. Receivers in a second functional block receive the electrical signals. In some cases, the two functional blocks are within a same die. In other cases, the two functional blocks are on separate dies. In either case, the metal traces have transmission line effects such as distributed inductance, capacitance and resistance throughout its length. For modern integrated circuits, the interconnect capacitance reduces signal integrity and signal transfer rate more so than gate capacitance of semiconductor devices.

The interconnect capacitance per unit length includes both sidewall fringing capacitance and cross-coupling capacitance. For example, the electromagnetic fields for the metal traces conducting signals and the return current on the ground plane create electrical interference on neighboring metal traces and on adjacent devices. As the operating voltage continues to decrease to reduce power consumption, the signal swing used for Boolean logic decreases as well as the noise margin.

In view of the above, efficient methods for receiving information as signals in a computing system are desired.

Figure 1:
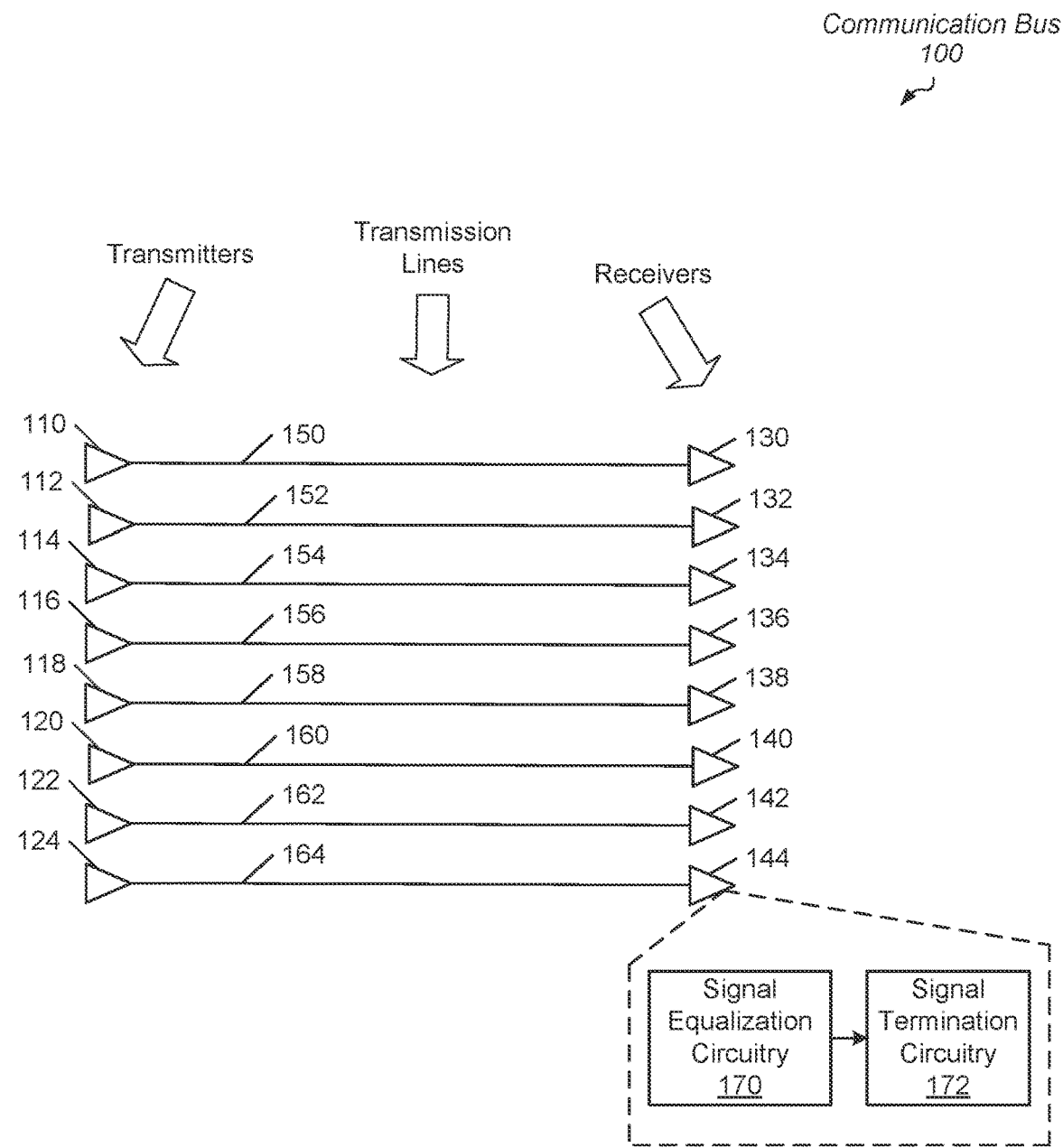
FIG. 1 is a block diagram of one implementation of a communication bus.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Various systems, apparatuses, methods, and computer-readable mediums for receiving information as signals in a computing system are disclosed. In various implementations, a computing system includes one or more functional blocks for processing applications. Examples of the functional blocks include a general-purpose central processing unit (CPU), a graphics processing unit (GPU), an accelerated processing unit (APU), a variety of input/output (I/O) devices, a memory controller for system memory, and so forth. The computing system also includes multiple interfaces for transferring data between the functional blocks. In some cases, two functional blocks transferring data between one another are within a same die. In other cases, the two functional blocks are on separate dies.

When transferring information between functional blocks, electrical signals are sent on multiple, parallel metal traces. Transmitters in a first functional block send the electrical signals across the parallel metal traces. Receivers in a second functional block receive the electrical signals. The metal traces have transmission line effects, such as distributed inductance, capacitance and resistance throughout the line length. To reduce signal reflection, the far end (receiving end) of the metal traces is terminated using the characteristic impedances of the metal traces. In some implementations, on-die termination (ODT) is used where a termination resistor for impedance matching is located inside the receiver instead of externally from the receiver such as on a printed circuit board (PCB) or off-die on a system on a chip (SOC) or multichip module (MCM).

The transmission line effects of the metal traces cause the signals being transmitted to experience loss and distortion, especially at relatively high frequency. Therefore, in addition to terminating the metal trace at the receiver, each receiver includes circuitry for equalization. Circuitry that performs equalization corrects for these losses and distortions by further boosting, or amplifying, the higher frequency component of an input signal received at the receiver, which allows each of the frequency components of this input signal to have a similar amplitude. Thus, the circuitry that performs equalization increases the high frequency gain of the input signal. The transmission line effects of the metal traces provide low-pass characteristics on the signals being transmitted. Therefore, the circuitry that performs equalization by providing a linear high-pass filter that offsets the low-pass characteristics of the metal traces.

The circuitry that performs equalization (or the equalization circuitry) at the receiver uses passive elements with no active elements such as transistors. Therefore, the equalization circuitry provides low power consumption, and consumes a relatively small amount of on-die area. In various implementations, the equalization circuitry is a linear filter used at the receiver that attenuates low frequency signal components, and boosts or amplifies the higher frequency signal components such as signal components near or at the Nyquist frequency. In various implementations, the equalization circuitry provides continuous time linear equalization (CTLE) with no feedback loop. Therefore, the equalization circuitry of the receivers does not use decision feedback equalization (DFE) with a decision circuit.

In various implementations, the equalization circuitry uses a bridged T-coil circuit between an input pin that receives the input signal and the termination resistor. The termination resistor has a variable resistance that is set based on reducing signal reflection on the transmission line. In other words, the termination resistor has its variable resistance set to provide impedance matching with the transmission line. The bridged T-coil circuit reduces the rise time of the voltage at the termination resistor by having the inductors of the bridged T-coil circuit temporarily disconnect the termination resistor from the capacitor. The current flowing through the inductors cannot change instantaneously, which allows the inductors to temporarily disconnect the termination resistor from the capacitor. Therefore, the inductors are able to direct the input current for a particular amount of time to only the capacitor of the bridged T-coil circuit. The capacitor charges more quickly than if the capacitor is directly connected in a parallel manner with the termination resistor.

Additionally, due to the presence of the inductors of the bridged T-coil circuit, the high frequency components of the input signal are not attenuated by the capacitor. The receiver also includes a comparator that receives the input signal and compares the input signal to a reference voltage. In an implementation, the comparator is a sense amplifier. The placement of the comparator and the ratio of the inductances of the inductors of the bridged T-coil circuit are based on whether the receiver includes self-diagnostic circuitry. Further details of the equalization circuitry are provided in the following discussion.

Referring to FIG. 1, a generalized block diagram of one implementation of a communication bus 100 is shown. As shown, communication bus 100 includes transmitters 110-124 for sending information as electrical signals, transmission lines 150-164 for transferring the electrical signals, and receivers 130-144 for receiving the signals. In various implementations, one or more of the receivers 130-144 include signal equalization circuitry 170 and signal termination circuitry 172. The directions of the transmitter currents on transmission lines 150-164 are based on whether the transmission lines 150-164 are being charged to logic high values or discharged to logic low values. In other words, the direct current (DC) patterns on the transmission lines 150-164 vary over time.

It is noted that the term "bus" may also be referred to as a "channel," and each "transmission line" is a "lane" or a "trace" or a "wire." In various implementations, transmission lines 150-164 are constructed from a variety of suitable metal sources during semiconductor fabrication and surrounded by a variety of any suitable insulating material. It is also noted that the terms "pin," "port," "terminal," and "node" are used interchangeably herein. Although eight transmitters 110-124, eight transmission lines 150-164 and eight receivers 130-144 are shown, in other implementations, any number of these components is used.

In some implementations, the signals sent from transmitters 110-124 to receivers 130-144 are single-ended data signals. The term "single-ended signal" is defined as an electric signal which is transmitted using a single signal conductor. For example, in an implementation, receiver 130 receives a single-ended signal from transmitter 110 via transmission line 150, which is a single signal conductor. In contrast to using single-ended data signals, sending information with differential data signals uses more lines and more pins. A reference signal is not used by the receivers 130-144 when differential data signals are used. As is known in the art, differential signaling generally provides better noise immunity than single-ended signaling. However, the use of differential signaling comes at the added cost of extra pins and extra traces.

In order to better handle noise issues when using single-ended signaling, one or more of the receivers 130-144 of the communication bus 100 include signal equalization circuitry 170 and signal termination circuitry 172. The signal termination circuitry 172 prevents reflection on a corresponding transmission line ending at a corresponding receiver. As shown, the signal termination circuitry 172 prevents reflection on transmission line 164 that includes reflection at any impedance change point between the transmitter 124 and the receiver 144. Although only receiver 144 is shown to include the signal equalization circuitry 170 and signal termination circuitry 172, it is possible and contemplated that one or more of the receivers 130-142 also include this type of circuitry. In an implementation, the signal termination circuitry 172 includes an on-die termination (ODT) resistor with a variable resistance capable of being set at two or more predetermined resistance values.

In various implementations, the signal equalization circuitry 170 uses a bridged T-coil circuit to provide continuous time linear equalization (CTLE) with no feedback loop. The signal equalization circuitry 170 performs equalization by providing a high-pass filter that offsets the low-pass characteristics of the transmission line 164. Although not shown, the receiver 144 also includes a comparator that receives the input signal and compares the input signal to a reference voltage. In an implementation, the comparator is a sense amplifier. The placement of the comparator and the ratio of the inductances of the inductors of the bridged T-coil circuit in the signal equalization circuitry 170 are based on whether the receiver 144 includes self-diagnostic circuitry.

Figure 2:
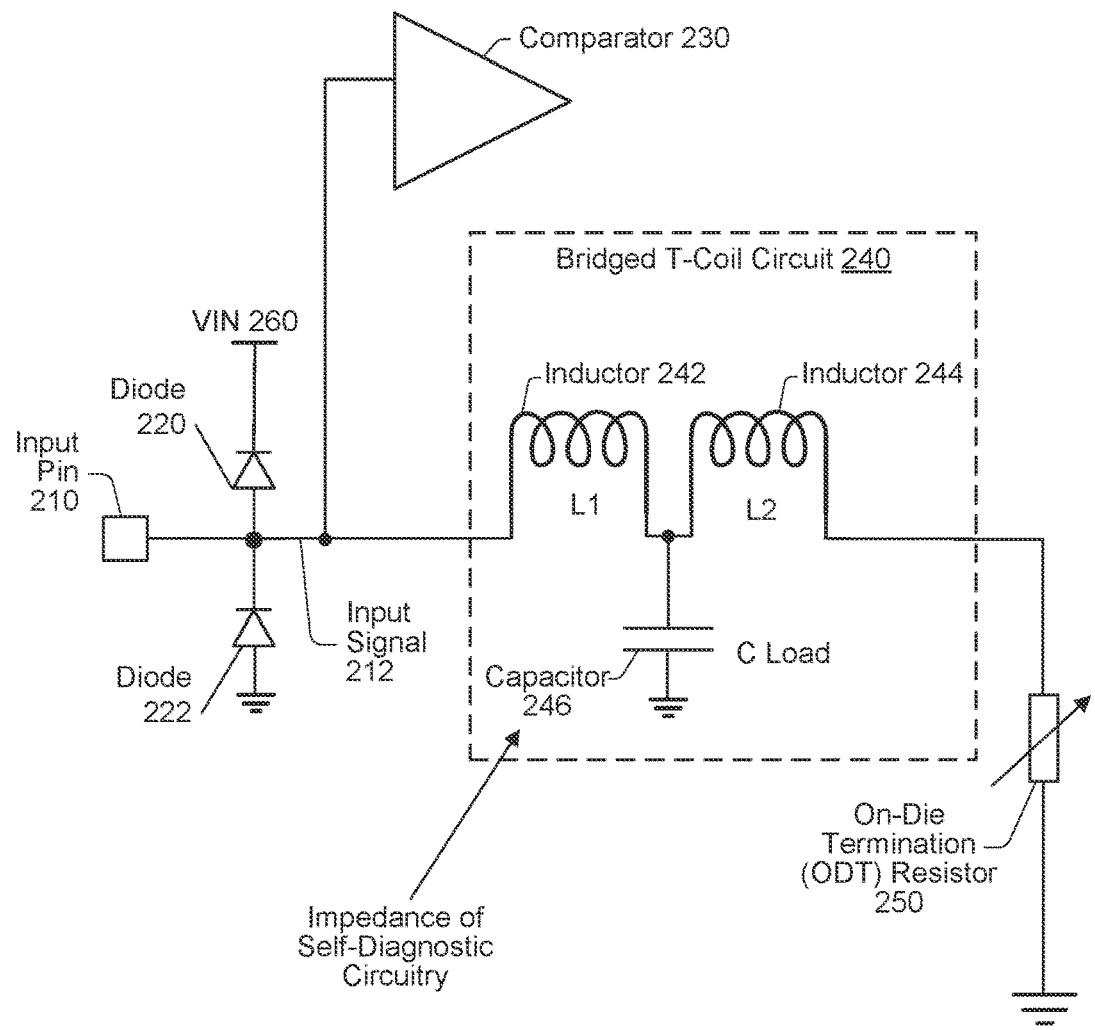
FIG. 2 is a block diagram of one implementation of a receiver front-end.

Turning now to FIG. 2, a generalized block diagram of one implementation of a receiver front-end 200 is shown. In the illustrated implementation, receiver front-end 200 includes an input pin 210 for receiving an input signal 212, diodes 220 and 222 that provide electrostatic discharge (ESD) protection, and a comparator 230 that sends an output signal based on the input signal 212 to a functional block (not shown) that includes at least a data storage element and a deserializer. The receiver front-end 200 also includes the on-die termination (ODT) resistor 250 and the bridged T-coil circuit 240 that provides equalization for the input signal 212.

The ESD protection circuitry uses clamping circuits such as diodes 220 and 222 in a series configuration. When an input voltage received on input pin 210 exceeds a supply voltage VIN 260 by a diode drop, the diode 220 turns on and conducts. Therefore, the voltage on the node of the input pin 210, which is also between the serially connected diodes 220 and 222, is clamped to the supply voltage VIN 260. When the input voltage received on input pin 210 falls below the ground reference voltage by the diode drop, the diode 222 turns on and conducts. Therefore, the voltage on the node of the input pin 210, which is also between the serially connected diodes 220 and 222, is clamped to the ground reference voltage. The range of voltages on the input pin 210 does not exceed the supply voltage VIN 260 by more than a threshold and does not fall below the ground reference voltage by more than a threshold. Here, the threshold is the diode drop of the diodes 220 and 222.

The ODT resistor 250 prevents reflection on a corresponding transmission line ending at input pin 210. Reflection at any impedance change point on the external transmission line including the end of the transmission line at receiver front-end 200 results in signal distortion, signal ringing and so forth. In some implementations, the ODT resistor 250 is a variable resistance capable of being set at two or more predetermined values. As shown, the ODT resistor 250 receives input signal 212 via inductors 242 and 244.

The comparator 230 receives the input signal 212 from the input pin 210, compares the received input signal to another signal, and generates an output signal based on the comparison. The comparator 230 sends the output signal to other circuitry, which is not shown for ease of illustration. In an implementation, the comparator 230 is implemented as a sense amplifier. In some implementations, the comparator 230 is a clocked sense amplifier although a clock input signal is not shown. In some implementations, the comparator 230 receives the input signal 212 on a positive terminal and receives a termination voltage on a negative terminal.

In an implementation, a period of time between a rising edge and a falling edge on the input signal 212 is used to determine a number of logic high values (binary '1') in an input bit stream. A period of time between a falling edge and a rising edge on the input signal 212 is used to determine a number of logic low values (binary '0') in the input bit stream. In an implementation, the comparator 230 sends a stream of binary values to a deserializer (not shown), which is included in the receiver outside of the front-end 200. In an implementation, the deserializer generates a sequence of parallel data words from the received stream of binary values and sends the data words to other logic blocks and/or arithmetic logic units. In some implementations, the deserializer decreases the data transfer rate, which allows the other logic blocks to operate at a lower clock frequency than clocked sense amplifiers.

The combination of the inductors L1 242 and L2 244 and the capacitor C Load 246 provides the bridged T-coil circuit 240. The bridged T-coil circuit 240 reduces the rise time of the voltage at the ODT resistor 250 by having the inductor L2 244 temporarily disconnect the ODT resistor 250 from the capacitor C Load 246. The current flowing through the inductors L1 242 and L2 244 cannot change instantaneously, which allows the inductors L1 242 and L2 244 to temporarily disconnect the ODT resistor 250 from the capacitor C Load 246. Therefore, the inductors L1 242 and L2 244 are able to direct the input signal 212 for a particular amount of time to only the capacitor C Load 246 of the bridged T-coil circuit 240. The capacitor C Load 246 charges more quickly than if the capacitor C Load 246 is directly connected in a parallel manner with the ODT resistor 250.

Additionally, due to the presence of the inductors L1 242 and L2 244 of the bridged T-coil circuit 240, the high frequency components of the input signal 212 are not attenuated by the capacitor C Load 246. The input impedance of the bridged T-coil circuit 240 is the ODT resistor 250, and the impedance of the capacitor C Load 246 is hidden while the impedances of the inductors L1 242 and L2 244 are transparent. Therefore, the bridged T-coil circuit 240 is used as an impedance matching network to create a constant, resistive input impedance such as the value of the ODT resistor 250. Further, the bridged T-coil circuit 240 provides equalization. As described earlier, circuitry that performs equalization corrects for losses and distortions of the input signal 212 caused by the low-pass characteristics of metal traces. The equalization circuitry, such as the bridged T-coil circuit 240, provides a linear high-pass filter that amplifies the higher frequency component of the input signal 212, which allows each of the frequency components of the input signal 212 to have a similar amplitude. The series combination of the inductors L1 242 and L2 244 provides equalization. Therefore, the bridged T-coil circuit 240 provides continuous time linear equalization (CTLE) with no feedback loop. For example, the bridged T-coil circuit 240 does not use decision feedback equalization (DFE).

As the inductances of the inductors L1 242 and L2 244 increases, the more equalization is provided by the bridged T-coil circuit 240. However, as the inductances of the inductors L1 242 and L2 244 increases, the equivalent series resistance (ESR) of the inductors L1 242 and L2 244 also increase. Therefore, sizing the inductors L1 242 and L2 244 includes design tradeoffs. In various implementations, the inductances of the inductors L1 242 and L2 244 are the same, so the bridged T-coil circuit 240 is a symmetric bridged T-coil circuit. In these cases, the ratio of the inductance of inductor L1 242 to the inductance of inductor L2 244 is one. In other words, L1/L2=1. In other implementations, the inductance of inductor L1 242 is slightly larger than the inductance of inductor L2 244. In these cases, the ratio of the inductance of inductor L1 242 to the inductance of inductor L2 244 is greater than one. In other words, L1>L2. How much L1 is greater than L2 is based on design requirements.

In various implementations, the receiver front-end 200 includes self-diagnostic circuitry (not shown). The self-diagnostic circuitry increases the reliability of the receiver that uses the receiver front-end 200. Probing certain circuits, such as radio frequency (RF) integrated circuits (ICs) affects the behavior of these circuits. Additionally, the limited on-die area does not provide area for a significant number of test nodes that can be accessed. Therefore, a built-in self-test (BIST) approach is used to determine whether semiconductor fabrication process variations and process faults have rendered the receiver unsuitable for its intended purpose. The fault coverage provided by the BIST approach using the self-diagnostic circuitry is based on the selected design for test (DFT) strategy.

When the receiver front-end 200 includes self-diagnostic circuitry, this circuitry is connected to the node between the inductors L1 242 and L2 244, and the capacitor C Load 246 models the impedance of this self-diagnostic circuitry. The self-diagnostic circuitry typically includes multiple components such as one or more of a test pattern generator, a BIST controller, selection logic that receives the signal on the node between the inductors L1 242 and L2 244, a comparator, a counter, and so forth. The number and type of components used in the self-diagnostic circuitry is based on design requirements. Regarding the capacitor C Load 246, the input of the selection logic is typically the component of the self-diagnostic circuitry that is directly connected to the node between the inductors L1 242 and L2 244, and accordingly, provides the capacitance of the capacitor C Load 246.

The selection logic typically includes a multiplexer, which can be implemented with Boolean logic gates, Boolean complex gates, or pass gates implemented with a pair of transistors. It is also possible and contemplated that an inverter or a buffer (two serially connected inverters) are used between the selection logic and the node between the inductors L1 242 and L2 244. In such implementations, the input of the inverter that is directly connected to this node provides the capacitance of the capacitor C Load 246. When pass gates are used for the selection logic, the diffusion capacitance of the source/drain terminals of the corresponding transistors provide the capacitance of the capacitor C Load 246. When transistors implementing Boolean logic are used for the selection logic, the gate capacitance of the gate terminals of the corresponding transistors provide the capacitance of the capacitor C Load 246. Although not shown, in some implementations, the receiver front-end 200 includes additional ESD protection circuitry directly connected to the node between the inductors L1 242 and L2 244. The capacitance of the corresponding two additional diodes connected in a series configuration on this node also contributes to the capacitance of the capacitor C Load 246.

The inductances of the inductors L1 242 and L2 244 increase due to the relatively large impedance of the self-diagnostic circuitry (the capacitor C Load 246). The increased inductances of the inductors L1 242 and L2 244 also increases the equalization provided by the bridged T-coil circuit 240. However, increased inductances of the inductors L1 242 and L2 244 also increases the ESR of the inductors L1 242 and L2 244. Therefore, the comparator 230 is connected to the node between the input pin 210 and the inductor L1 242, rather than connected to the node between the inductors L1 242 and L2 244 similar to the capacitor C Load 246. The relatively large ESR of the inductor L1 242 would distort the signal received by the comparator 230. However, when receiver front-end 200 does not include self-diagnostic circuitry, it is possible for the comparator 230 to be moved and connected to the node between the inductors L1 242 and L2 244. Such an implementation is described in the following discussion.

Figure 3:
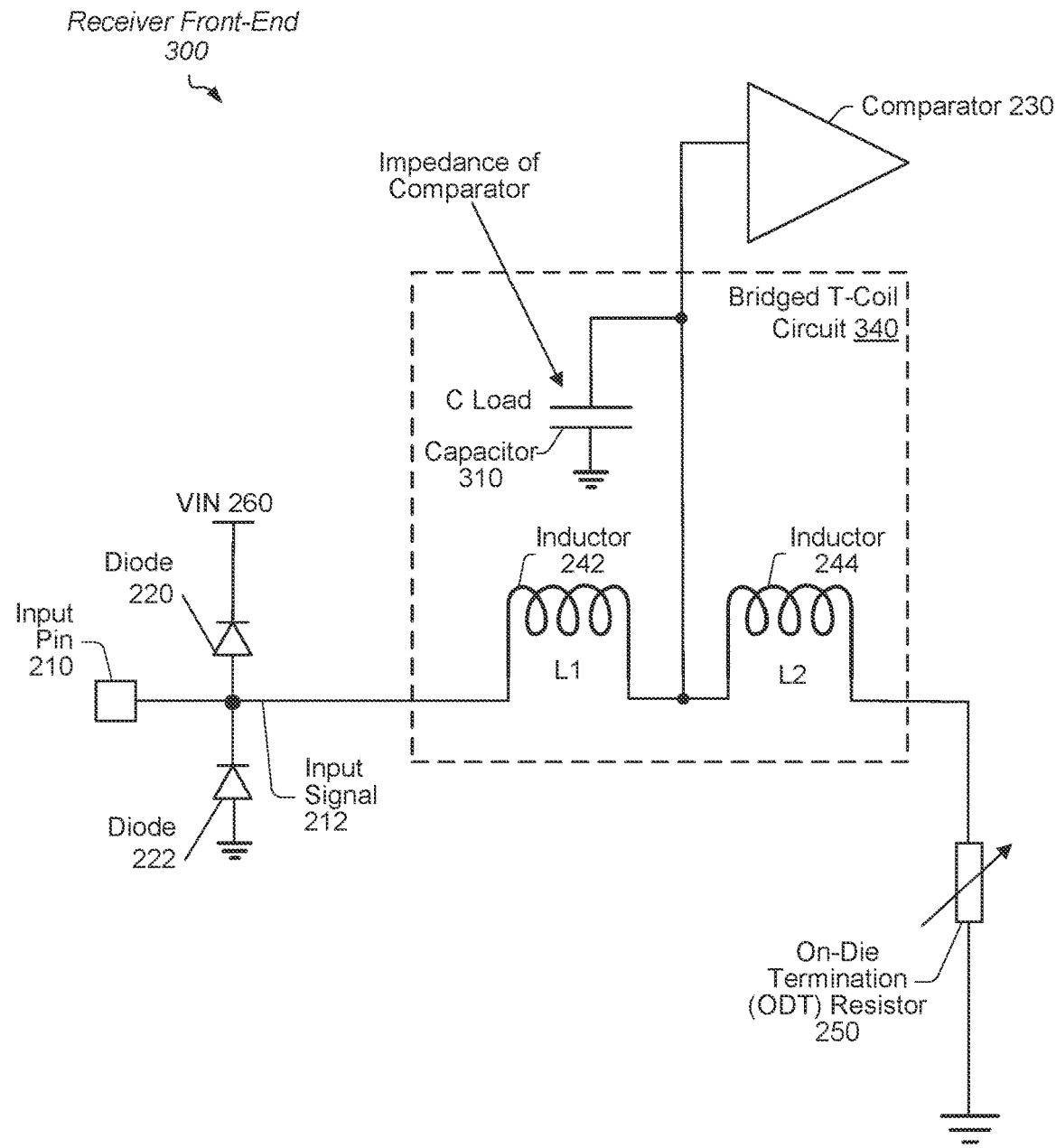
FIG. 3 is a block diagram of one implementation of a receiver front-end.

Turning now to FIG. 3, a generalized block diagram of one implementation of a receiver front-end 300 is shown. Circuitry and signals previously described are numbered identically. The receiver front-end 300 includes the bridged T-coil circuit 340 that provides equalization for the input signal 212. The bridged T-coil circuit 340 uses the inductors L1 242 and L2 244 and the capacitor C Load 310. The receiver front-end 300 does not include self-diagnostic circuitry, so this circuitry is not connected to the node between the inductors L1 242 and L2 244. The inductances of the inductors L1 242 and L2 244 decrease due to having no relatively large impedance of the self-diagnostic circuitry being connected between them. The decreased inductances of the inductors L1 242 and L2 244 also decreases the ESR of the inductors L1 242 and L2 244. Therefore, the comparator 230 is connected to the node between the inductors L1 242 and L2 244, rather than connected at the node between the input pin 210 and the inductor L1 242.

In the receiver front-end 300, the comparator 230 receives the input signal 212 via the inductor L1 242. The relatively small ESR of the inductor L1 242 in the receiver front-end 300 does not distort the signal received by the comparator 230. The capacitor C Load 310 of the bridged T-coil circuit 340 models the input impedance of the comparator 230. Referring briefly again to the receiver front end 200 (of FIG. 2), the capacitor C Load 310, which models the input impedance of the comparator 230, is located at the node between the input pin 210 and the inductor L1 242.

Figure 4:
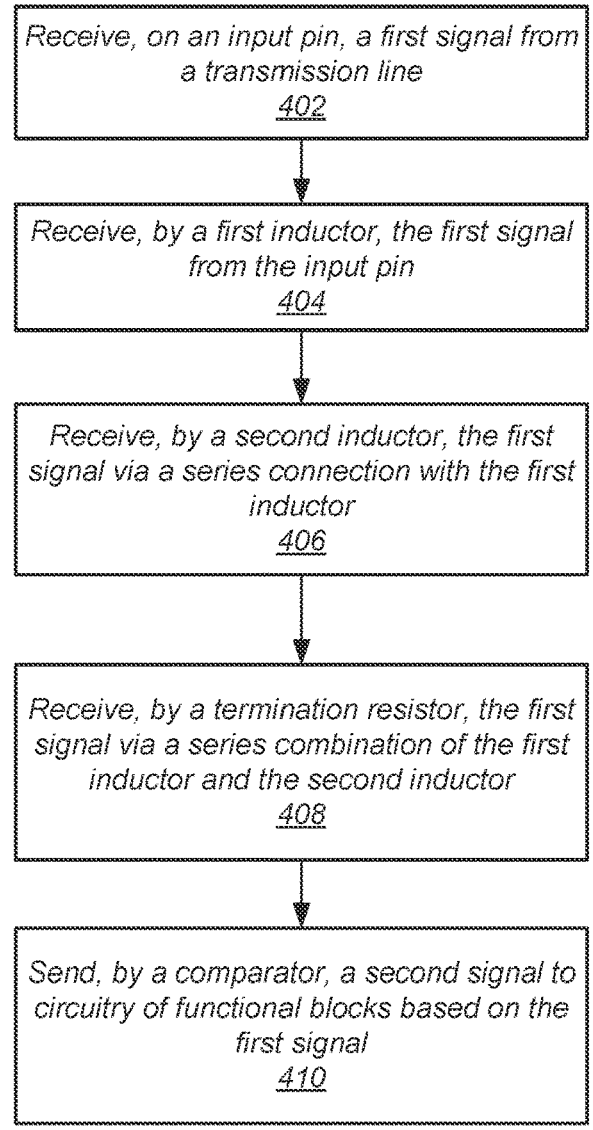
FIG. 4 is a flow diagram of one implementation of a method for receiving information as signals in a computing system.

Referring now to FIG. 4, one implementation of a method 400 for receiving information as signals in a computing system is shown. For purposes of discussion, the steps in this implementation (as well as in FIGS. 5-6) are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

An input pin of a receiver front-end receives a first signal from a transmission line (block 402). In some implementations, the first signal is a single-ended data signal. In an implementation, a transmitter sends the first signal across a transmission line to a receiver that includes the receiver front-end. A first inductor receivers the first signal from the input pin (block 404). The receiver front-end uses a bridged T-coil circuit to provide equalization. The first inductor is one of two inductors of the bridged T-coil circuit. A second inductor receives the first signal via a series connection with the first inductor (block 406). A termination resistor, such as an ODT resistor, receives the first signal via the series combination of the first inductor and the second inductor (block 408). The series combination of the first inductor and the second inductor provides an input impedance of the receiver front-end equal to the termination resistor. A comparator sends a second signal to circuitry of functional blocks based on the first signal (block 410). In some implementations, the comparator is a sense amplifier, such as a clocked sense amplifier, that compares the first signal to a reference voltage. The comparator generates the second signal based on the comparison.

Figure 5:
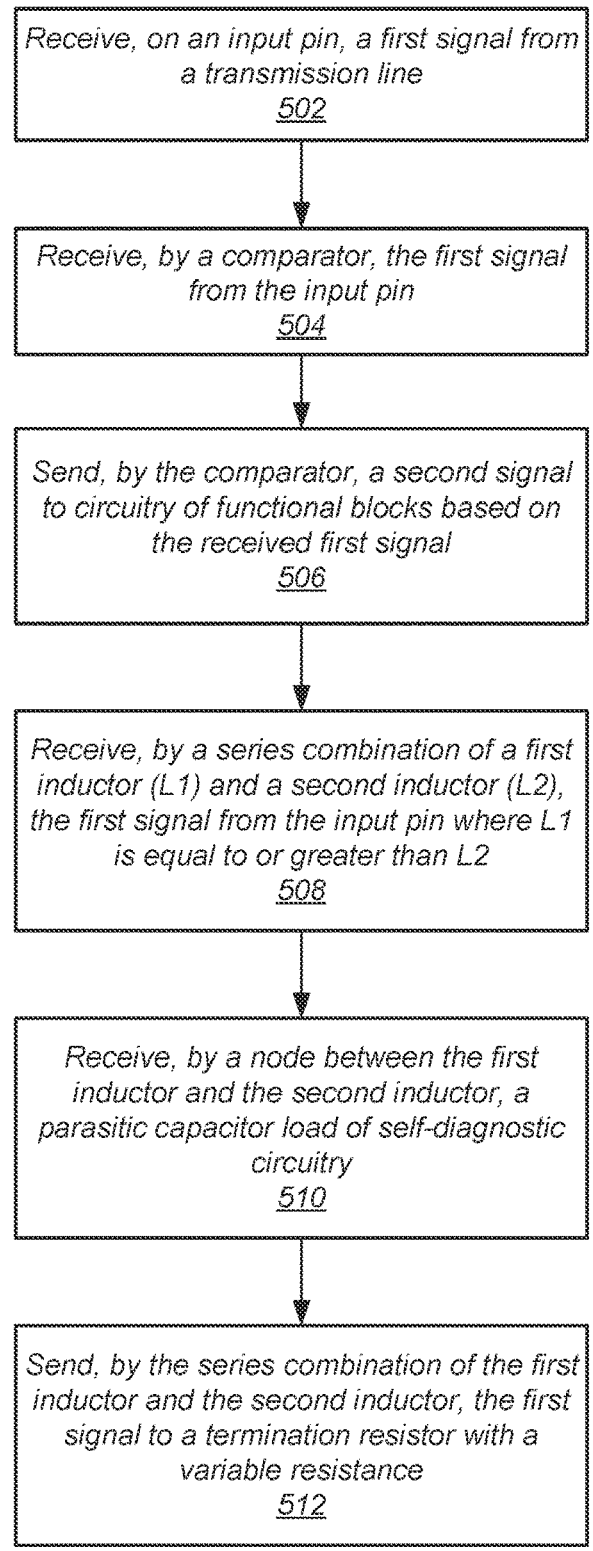
FIG. 5 is a flow diagram of one implementation of a method for receiving information as signals in a computing system.

Turning now to FIG. 5, one implementation of a method 500 for receiving information as signals in a computing system is shown. An input pin of a receiver front-end receives a first signal from a transmission line (block 502). In some implementations, the first signal is a single-ended data signal. In an implementation, a transmitter sends the first signal across a transmission line to a receiver that includes the receiver front-end. The receiver front-end uses a bridged T-coil circuit to provide equalization. The first inductor is one of two inductors of the bridged T-coil circuit. A comparator receives the first signal from the input pin (block 504). The comparator sends a second signal to circuitry of functional blocks based on the received first signal (block 506).

A series combination of a first inductor and a second inductor of the bridged T-coil circuit receives the first signal from the input pin (block 508). A first inductance (L1) of the first inductor is equal to or greater than a second inductance (L2) of the second inductor. In other words, L1>L2, or the ratio of L1 to L2 is equal to or greater than one. A node between the first inductor and the second inductor receives a parasitic capacitor load of self-diagnostic circuitry (block 510). Therefore, the inductances of the first inductor and the second inductor are relatively large. Accordingly, the comparator is connected as described externally from the bridged T-coil circuit. The series combination of the first inductor and the second inductor sends the first signal to a termination resistor with a variable resistance (block 512). In some implementations, the termination resistor is statically set once to a predetermined value based on the impedance of the transmission line. In another implementation, the termination resistor is initially set to a predetermined value based on the impedance of the transmission line, and then dynamically updated based on operating conditions that change the impedance of the transmission line. For example, operating temperature and circuit age affect the impedance of the transmission line. The receiver front-end includes a state machine or other control circuitry that dynamically updates the resistance of the termination resistor.

Figure 6:
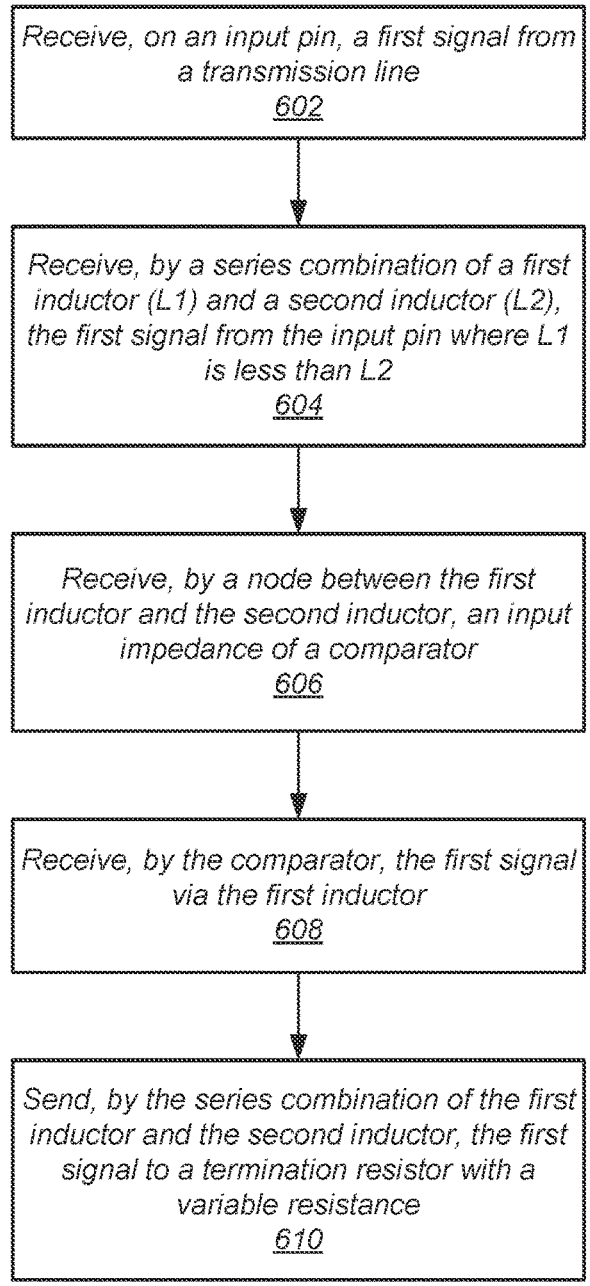
FIG. 6 is a flow diagram of one implementation of a method for receiving information as signals in a computing system.

Referring to FIG. 6, one implementation of a method 600 for receiving information as signals in a computing system is shown. An input pin of a receiver front-end receives a first signal from a transmission line (block 602). In some implementations, the first signal is a single-ended data signal. In an implementation, a transmitter sends the first signal across a transmission line to a receiver that includes the receiver front-end. The receiver front-end uses a bridged T-coil circuit to provide equalization. A series combination of a first inductor (L1) and a second inductor (L2) of the bridged T-coil circuit receives the first signal from the input pin (block 604). A first inductance (L1) of the first inductor is less than a second inductance (L2) of the second inductor. In other words, L1<L2, or the ratio of L1 to L2 is less than one.

A node between the first inductor and the second inductor receives an input impedance of a comparator (block 606). The comparator receives the first signal via the first inductor (block 608). When the receiver front-end does not include self-diagnostic circuitry, the inductances of the first inductor and the second inductor decrease. The decreased inductances reduce the equalization provided by the bridged T-coil circuit, but allow the comparator to be placed at the node between the first inductor and the second inductor. Therefore, the signal received by the comparator has some loss and distortion removed by the equalization provided by the bridged T-coil circuit. The series combination of the first inductor and the second inductor sends the first signal to a termination resistor with a variable resistance (block 610). The equalization provided by the bridged T-coil circuit causes the input impedance of the receiver front-end to be the resistance of the termination resistor.

Figure 7:
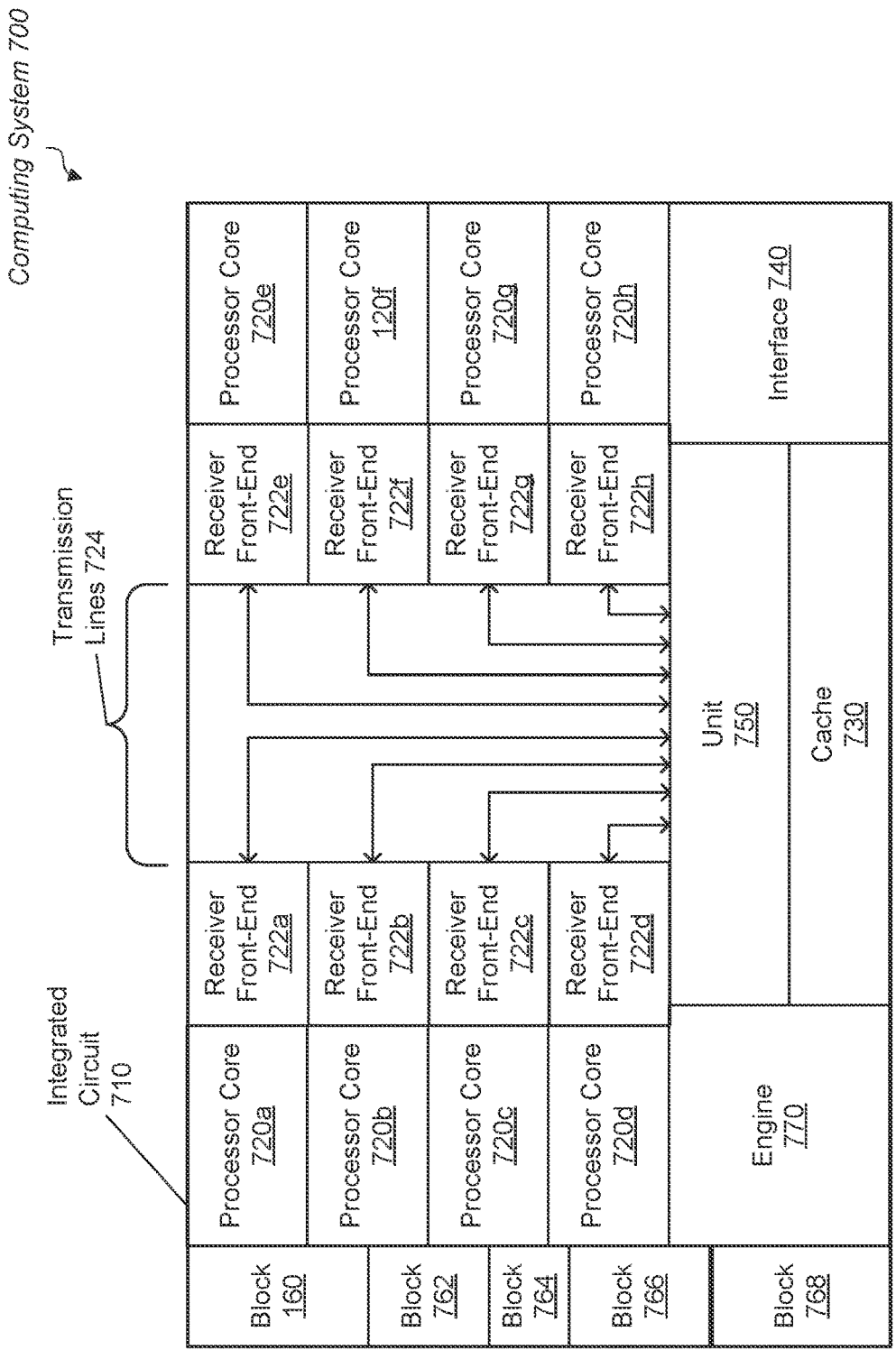
FIG. 7 is a block diagram of one implementation of a computing system using a communication bus.

Turning now to FIG. 7, a generalized block diagram of one implementation of a computing system 700 using a communication bus is shown. The integrated circuit 710 includes processor cores 720*a*-720*h*, cache 730, interface 740, unit 750, functional blocks 760-768, and engine 770. The processor cores 720*a*-720*h* use receiver front-end blocks 722*a*-722*h* for communicating with unit 750. The integrated circuit 710 includes multiple types of designs providing a variety of functionalities. In some implementations, the integrated computing system 700 is a system on a chip (SoC) that includes a variety of processing units and functional blocks providing a variety of functionalities. In an implementation, cache 730, interface 740, unit 750, functional blocks 760-768, and engine 770 provide separate functionality. In contrast, each of processor cores 720*a*-720*h* provides a same functionality. For example, in some designs, each of processor cores 720*a*-720*h* is an instantiation of a same processor core. It is also possible and contemplated that two or more of the functional blocks 760-768 provide a same functionality.

In some implementations, the integrated circuit 710 includes a central processing unit (CPU) with circuitry used for processing instructions of a selected instruction set architecture (ISA), a graphics processing unit (GPU) with circuitry that implements a high parallel data microarchitecture, a Hub used for communicating with multimedia engine, and a multimedia engine, such as engine 770, with circuitry that processes audio data and visual data for multimedia applications. In another implementation, the unit 750 and the functional blocks 760-768 include one or more application specific integrated circuits (ASICs) or microcontrollers, one or more digital signal processors (DSPs), analog-to-digital converters (ADCs), and digital-to-analog converters (DACs).

In an implementation, a communication fabric supports communication between the components of the integrated circuit 710. The communication fabric supports the transfer of messages, requests, responses, acknowledgments, commands, interrupts, and so forth between the multiple components within the integrated circuit 710 and one or more external processing units and peripheral devices. In various implementations, the communication among components of the integrated circuit 710 includes at least the transmission lines 724 between the unit 750 and the processor cores 720*a*-720*h*, each using a corresponding one of the receiver front-end blocks 722*a*-722*h*. In various implementations, each of the receiver front-end blocks 722*a*-722*h* utilizes an implementation such as the receiver front-end 200 (of FIG. 2) and the receiver front-end 300 (of FIG. 3) based on whether the receiver front-end blocks 722*a*-722*h* includes self-diagnostic circuitry.

As shown, the transmission lines 724 have varying metal trace lengths based on an on-die location of a corresponding one of the processor cores 720*a*-720*h*. Therefore, the impedance of the transmission lines 724 vary among one another. In addition to the varying metal trace lengths, in some implementations, the metal traces of the transmission lines 724 also vary among metal layer thicknesses and spacings between metal traces. Each of the receiver front-end blocks 722*a*-722*h* include a termination resistor with a variable resistance set based on an impedance of a corresponding one of the transmission lines 724. In some implementations, the termination resistor is statically set once to a predetermined value based on the impedance of a corresponding one of the transmission lines 724. In another implementation, the termination resistor is initially set to a predetermined value based on the impedance of a corresponding one of the transmission lines 724, and then dynamically updated based on operating conditions that change the impedance of the corresponding one of the transmission lines 724. For example, operating temperature and circuit age affect the impedance of the corresponding one of the transmission lines 724. The receiver front-end blocks 722*a*-722*h* include a state machine or other control circuitry that dynamically updates the resistance of the termination resistor.

The circuitry of the interface 740 communicates with one of an external memory, an external peripheral device, another semiconductor chip, or other. The interface 740 includes queues for storing requests and responses as well as circuitry for supporting a particular communication protocol. Although a single interface is shown, it is possible and contemplated that the integrated circuit 710 uses multiple interfaces. In various implementations, the multiple components of the integrated circuit 710 supports a cache memory subsystem that includes integrated caches as well as external caches such as the shared cache 730.

Figure 8:
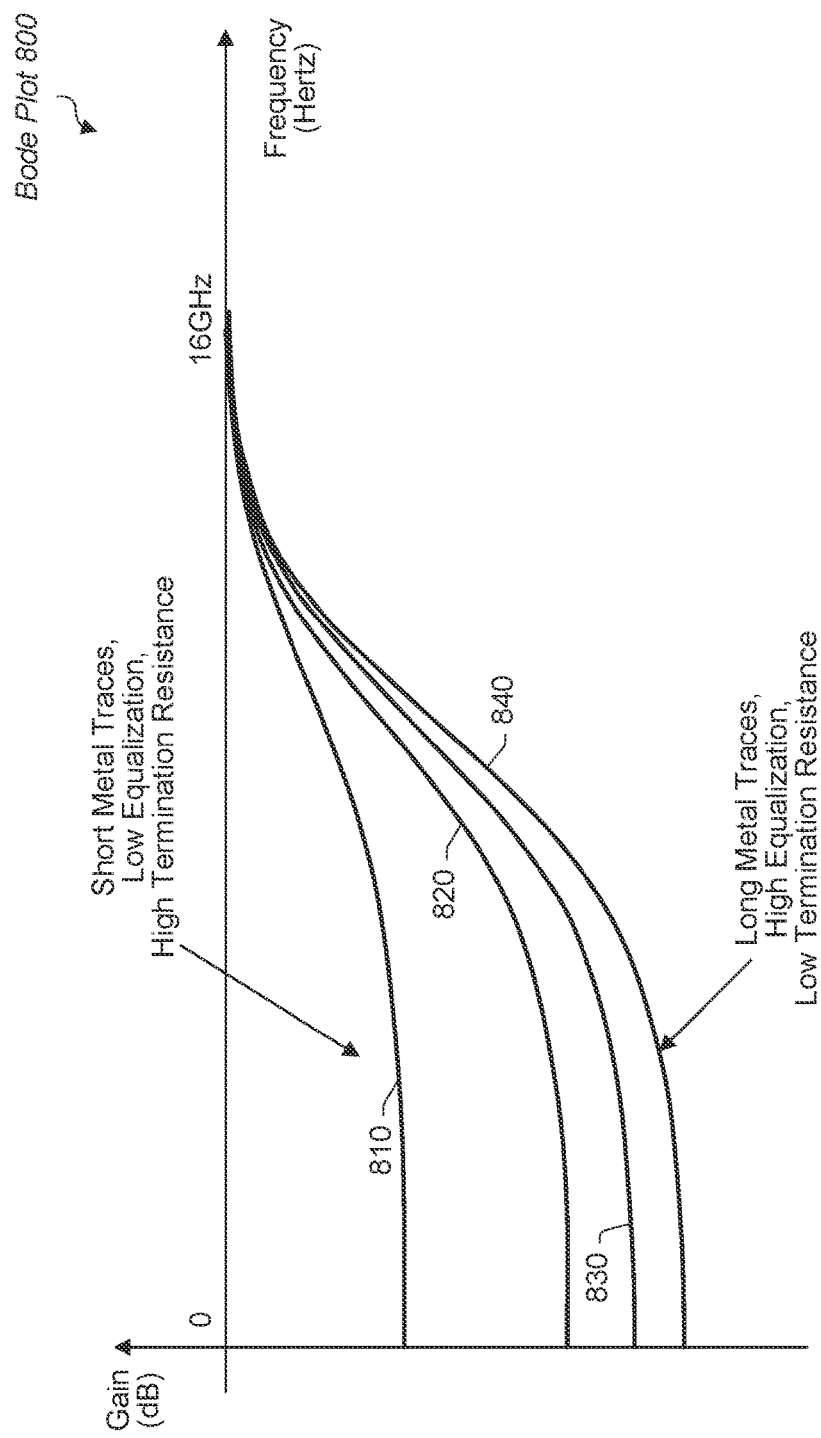
FIG. 8 is a block diagram of one implementation of a bode plot.

Referring to FIG. 8, a generalized block diagram of one implementation of a Bode plot 800 is shown. The waveforms 810-840 illustrate gain versus frequency of different receiver front-end blocks. The y-axis of the Bode plot 800 is the gain, or a ratio of the output voltage to the input voltage, measured in dB, and since dB is logarithmic measurement, the gain is plotted on a logarithmic (log) scale. The x-axis of the Bode plot 800 is frequency of the input signal being transmitted on a transmission line. The frequency is also measured on a logarithmic scale, so the Bode plot 800 is a log-log plot. For relatively short transmission lines, the corresponding receiver front-end block provides less equalization, but a higher termination resistance. The waveform 810 illustrates these characteristics. Therefore, the receiver front-end block corresponding to waveform 810 has the smallest amount of inductances for the series combination of inductors of the bridged T-coil circuit among the receiver front-end blocks that provide the waveforms 810-840.

In contrast, for relatively long transmission lines, the corresponding receiver front-end block provides more equalization, but a lower termination resistance. The waveform 840 illustrates these characteristics. Therefore, the receiver front-end block corresponding to waveform 840 has the largest amount of inductances for the series combination of inductors of the bridged T-coil circuit among the receiver front-end blocks that provide the waveforms 810-840. The waveforms 820 and 830 illustrate intermediate characteristics between the waveforms 810 and 840. The amount of inductance for the series combination of inductors of the bridged T-coil circuits are also based on whether the receiver front-end blocks include self-diagnostic circuitry. For example, in various implementations, the receiver front-end blocks utilize one of the receiver front-end 200 (of FIG. 2) and the receiver front-end 300 (of FIG. 3).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A circuit comprising:
an input configured to receive a first signal from a transmission line comprising a metal trace with an impedance along the metal trace;
a first inductor coupled to receive the first signal from the input;
a second inductor connected in series with the first inductor, wherein a node between the first inductor and the second inductor comprises a capacitive load of circuitry that processes the first signal and at least one other signal within the circuit;
a termination resistor connected in series with the second inductor; and
a comparator configured to convey a second signal based on the first signal to circuitry of functional blocks.

2. The circuit as recited in claim 1, further comprising electrostatic discharge (ESD) protection circuitry between the input and the first inductor, wherein the ESD protection circuitry is configured to clamp the first signal to a given range of voltages.

3. The circuit as recited in claim 1, wherein the capacitive load of circuitry comprises a parasitic capacitive load of self-diagnostic circuitry.

4. The circuit as recited in claim 3, wherein the termination resistor has a resistance that provides an impedance matching the impedance of the metal trace of the transmission line.

5. The circuit as recited in claim 3, wherein a first inductance of the first inductor is equal to or greater than a second inductance of the second inductor.

6. The circuit as recited in claim 1, wherein:
the comparator is configured to receive the first signal via the first inductor; and
the capacitive load of circuitry comprises an input capacitance of the comparator.

7. The circuit as recited in claim 6, wherein a first inductance of the first inductor is less than a second inductance of the second inductor.

8. A method comprising:
receiving, by an input, a first signal from a transmission line comprising a metal trace with an impedance along the metal trace;
receiving, by a first inductor, the first signal from the input;
receiving, by a second inductor, the first signal via a series connection with the first inductor, wherein a node between the first inductor and the second inductor comprises a capacitive load of circuitry that processes the first signal and at least one other signal within a receiver that comprises the first inductor and the second inductor;
receiving, by a termination resistor, the first signal via a series connection with a series combination of the first inductor and the second inductor; and
conveying, by a comparator, a second signal based on the first signal to circuitry of functional blocks.

9. The method as recited in claim 8, further comprising clamping the first signal to a given range of voltages by electrostatic discharge (ESD) protection circuitry between the input and the first inductor.

10. The method as recited in claim 8, wherein the capacitive load of circuitry comprises a parasitic capacitive load of self-diagnostic circuitry.

11. The method as recited in claim 10, wherein the termination resistor has a resistance that provides an impedance matching the impedance of the metal trace of the transmission line.

12. The method as recited in claim 10, wherein a first inductance of the first inductor is equal to or greater than a second inductance of the second inductor.

13. The method as recited in claim 8, further comprising receiving, by the comparator, the first signal via the first inductor, wherein the capacitive load of circuitry comprises an input capacitance of the comparator.

14. The method as recited in claim 13, wherein a first inductance of the first inductor is less than a second inductance of the second inductor.

15. An apparatus comprising:
- a plurality of receivers configured to receive signals; and
- a plurality of transmitters configured to send a plurality of signals to the plurality of receivers via a plurality of transmission lines, each comprising a metal trace with a corresponding impedance along the metal trace;
- wherein a given receiver of the plurality of receivers is configured to receive a first signal of the plurality of signals from a given transmitter of the plurality of transmitters; and
- wherein the given receiver comprises:
  - an input configured to receive the first signal from the given transmitter via a transmission line of the plurality of transmission lines;
  - a first inductor coupled to receive the first signal from the input;
  - a second inductor connected in series with the first inductor, wherein a node between the first inductor and the second inductor comprises a capacitive load of circuitry of the given receiver that processes the first signal and at least one other signal within the given receiver;
  - a termination resistor connected in series with the second inductor; and
  - a comparator configured to convey a second signal based on the first signal to circuitry of functional blocks.

16. The apparatus as recited in claim 15, wherein the capacitive load of circuitry comprises a parasitic capacitive load of self-diagnostic circuitry.

17. The apparatus as recited in claim 16, wherein the termination resistor has a resistance that provides an impedance matching the impedance of the metal trace of the transmission line.

18. The apparatus as recited in claim 16, wherein a first inductance of the first inductor is equal to or greater than a second inductance of the second inductor.

19. The apparatus as recited in claim 15, wherein:
the comparator is configured to receive the first signal via the first inductor; and
the capacitive load of circuitry comprises an input capacitance of the comparator.

20. The apparatus as recited in claim 19, wherein a first inductance of the first inductor is less than a second inductance of the second inductor.

* * * * *